US007817086B2

(12) United States Patent
Sugimoto

(10) Patent No.: US 7,817,086 B2
(45) Date of Patent: Oct. 19, 2010

(54) POSITIONING METHOD, SATELLITE SIGNAL SELECTION METHOD, SATELLITE APPROPRIATENESS CALCULATION METHOD, CALCULATION CIRCUIT, AND POSITIONING DEVICE

(75) Inventor: Takuya Sugimoto, Kanagawa (JP)

(73) Assignee: Seiko Epson Corporation, Tokyo (JP)

( * ) Notice: Subject to any disclaimer, the term of this patent is extended or adjusted under 35 U.S.C. 154(b) by 332 days.

(21) Appl. No.: 11/953,634

(22) Filed: Dec. 10, 2007

(65) Prior Publication Data
US 2008/0174479 A1 Jul. 24, 2008

(30) Foreign Application Priority Data
Dec. 15, 2006 (JP) ............................. 2006-339145

(51) Int. Cl.
G01S 1/00 (2006.01)
(52) U.S. Cl. .............................. 342/357.25; 342/357.67
(58) Field of Classification Search ............. 342/357.15
See application file for complete search history.

(56) References Cited

U.S. PATENT DOCUMENTS

2002/0050944 A1* 5/2002 Sheynblat et al. ...... 342/357.06
2004/0110514 A1* 6/2004 Kim et al. ................ 455/456.1
2007/0027624 A1* 2/2007 Powe et al. ................. 701/213

FOREIGN PATENT DOCUMENTS

JP 2006-112936 A 4/2006

* cited by examiner

Primary Examiner—Thomas H Tarcza
Assistant Examiner—Harry Liu
(74) Attorney, Agent, or Firm—Global IP Counselors, LLP

(57) ABSTRACT

The vector coordinates of each acquired satellite are calculated, the vector coordinates being given by the coordinates of an end point of a vector of which the direction coincides with the direction (azimuth) of the corresponding acquired satellite based on the present position and the magnitude corresponds to a signal strength. An overall BOP that indicates the deflection of the acquired satellite signals is calculated by adding up the vector coordinates of each acquired satellite signal. The position of the overall BOP indicates the direction of deflection (deflection azimuth) of the acquired satellite signals, and the distance from an origin O indicates the degree of deflection (deflection strength) of the acquired satellite signals.

15 Claims, 11 Drawing Sheets

COEFFICIENTS P1 AND P2

|  | FIRST POSITIONING MODE | SECOND POSITIONING MODE |
|---|---|---|
| COEFFICIENT P1 | 5 | 3 |
| COEFFICIENT P2 | 40 | 30 |

○ : VECTOR COORDINATES
● : OVERALL BOP

EXAMPLE 1. IN ROOM

EXAMPLE 2. IN OPEN AIR

⊘ : VECTOR COORDINATES
● : OVERALL BOP

FIG. 12
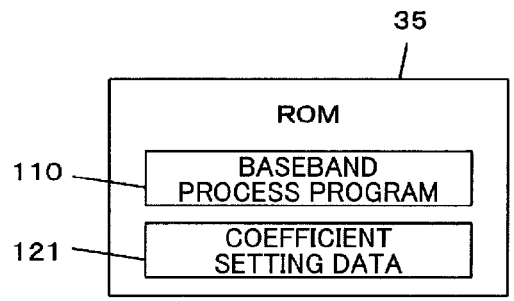
FIG. 13
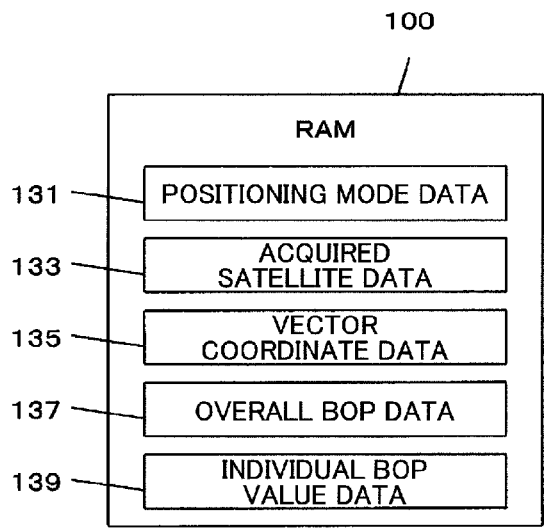
FIG. 14
ACQUIRED SATELLITE DATA
| SATELLITE NUMBER 133a | POSITION 133b | MOVING VELOCITY 133c | MOVING DIRECTION 133d | SIGNAL STRENGTH 133e |
|---|---|---|---|---|
| 1 | (xp1, yp1, zp1) | V1 | (xv1, yv1, zv1) | S1 |
| 2 | (xp2, yp2, zp2) | V2 | (xv2, yv2, zv2) | S2 |
| 3 | (xp3, yp3, zp3) | V3 | (xv3, yv3, zv3) | S3 |
| ⋮ | ⋮ | ⋮ | ⋮ | ⋮ |

VECTOR COORDINATE DATA

| SATELLITE NUMBER (135a) | GAIN (135b) | VECTOR COORDINATE (135c) |
|---|---|---|
| 1 | G1 | ($\alpha$1, $\beta$1) |
| 2 | G2 | ($\alpha$2, $\beta$2) |
| 3 | G3 | ($\alpha$3, $\beta$3) |
| ⋮ | ⋮ | ⋮ |

135

OVERALL BOP DATA ($\alpha$n, $\beta$n)   137

INDIVIDUAL BOP VALUE DATA

139

| SATELLITE NUMBER (139a) | INDIVIDUAL BOP VALUE (139b) | INAPPROPRIATENESS FLAG (139c) |
|---|---|---|
| 1 | 0.5 | 0 |
| 2 | 0.8 | 0 |
| 3 | 0.6 | 0 |
| ⋮ | ⋮ | ⋮ |

# POSITIONING METHOD, SATELLITE SIGNAL SELECTION METHOD, SATELLITE APPROPRIATENESS CALCULATION METHOD, CALCULATION CIRCUIT, AND POSITIONING DEVICE Japanese Patent Application No. 2006-339145 filed on Dec. 15, 2006, is hereby incorporated by reference in its entirety.

BACKGROUND OF THE INVENTION

The present invention relates to an index value calculation method, a satellite signal selection method, a satellite appropriateness calculation method, a calculation circuit, and a positioning device.

The global navigation satellite system (GLONASS), the GALILEO, the quasi-zenith satellite, and the like are known as satellite positioning systems. The most widespread satellite positioning system is the global positioning system (GPS).

According to the GPS, four GPS satellites are disposed in each of six earth orbits at a tilt angle of 55 degrees, and are operated so that each GPS satellite orbits the earth every 11 hours, 58 minutes, and 2 seconds. Therefore, the satellite constellation of the GPS satellites changes depending on the present position and the positioning time. A dilution of precision (DOP) is known as an index which indicates the effects of the satellite constellation on the positioning accuracy. The DOP is a numerical value which indicates the satellite constellation of each GPS satellite when observing the sky from a point (present position) on the ground. In other words, the DOP is a numerical value which indicates the degree by which the satellite constellation of each GPS satellite decreases the positioning accuracy. Various technologies of accurately locating a position using the DOP have been developed (see JP-A-2006-112936, for example).

However, the positioning accuracy is not affected by only the satellite constellation. For example, the positioning accuracy is affected when a person carrying a GPS positioning device enters a building, or is affected by a multipath. Specifically, the positioning accuracy varies to a large extent depending on a reception environment in which a satellite signal is received. Therefore, it is convenient if an overall index taking into account the satellite constellation and the reception environment can be calculated. Since the DOP is an index of the entire satellite constellation, it is convenient if a relative index of each satellite in the present satellite constellation can be calculated.

SUMMARY

According to one aspect of the invention, there is provided an index value calculation method comprising calculating an index based on given azimuths of satellites that have transmitted received satellite signals for positioning and given signal strengths of the received satellite signals, the index indicating reliability of the received satellite signals.

According to another aspect of the invention, there is provided a calculation circuit comprising an index calculation section that calculates an index based on given azimuths of satellites that have transmitted received satellite signal for positioning and given signal strengths of the received satellite signals, the index indicating reliability of the received satellite signals.

BRIEF DESCRIPTION OF THE SEVERAL VIEWS OF THE DRAWING

FIG. 12 is a configuration diagram of a ROM.
FIG. 13 is a configuration diagram of a RAM.
FIG. 14 shows a data configuration example of acquired satellite data.

DETAILED DESCRIPTION OF THE EMBODIMENT

Figure 1:
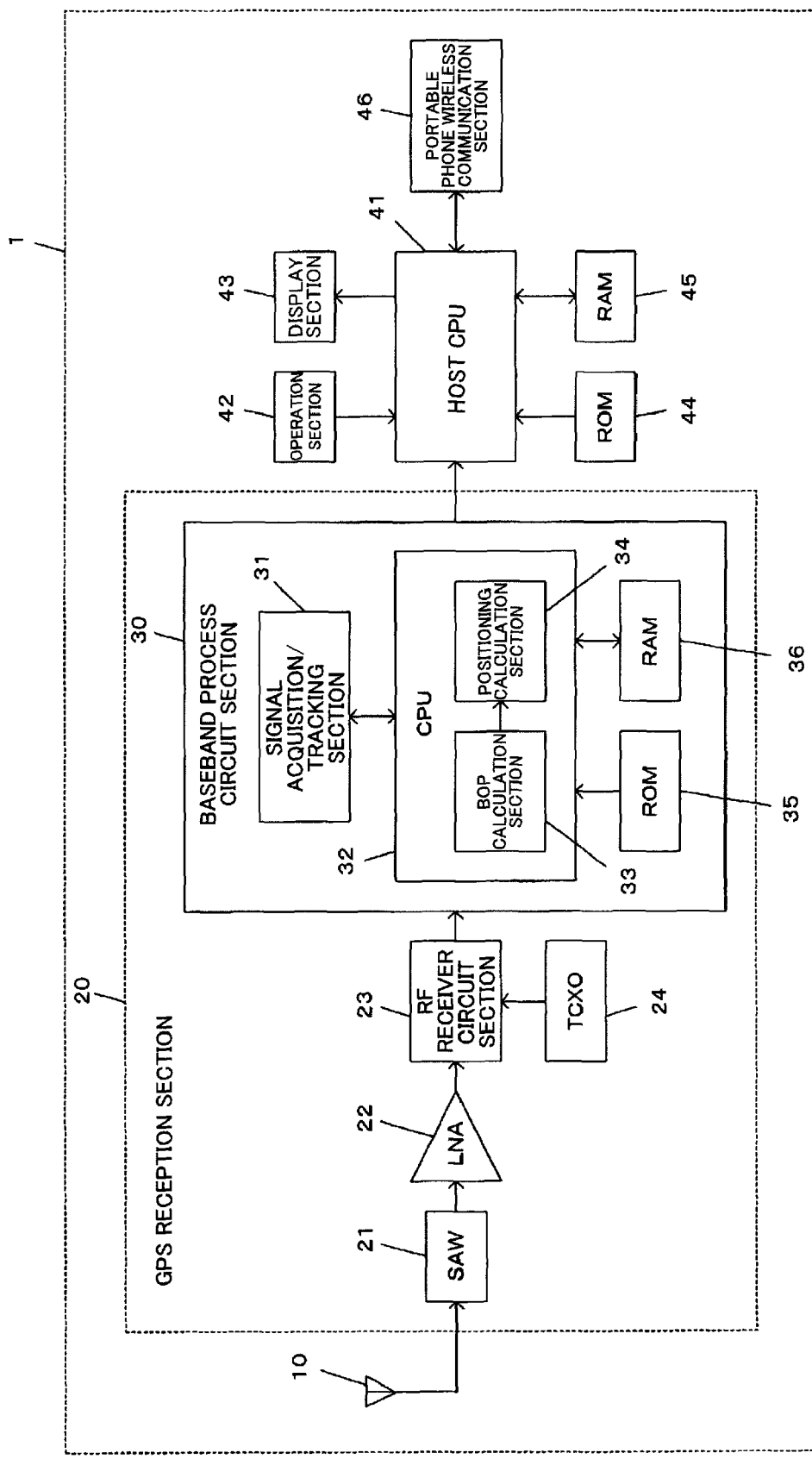
FIG. 1 is an internal configuration diagram of a portable phone.

The invention may provide an index that contributes to an increase in positioning accuracy, that is, a novel index taking the satellite constellation and the reception environment into consideration.

According to one embodiment of the invention, there is provided an index value calculation method comprising calculating an index based on given azimuths of satellites that have transmitted received satellite signals for positioning and given signal strengths of the received satellite signals, the index indicating reliability of the received satellite signals.

According to another embodiment of the invention, there is provided a calculation circuit comprising an index calculation section that calculates an index based on given azimuths of satellites that have transmitted received satellite signal for positioning and given signal strengths of the received satellite signals, the index indicating reliability of the received satellite signals.

According to the above configuration, the index that indicates the reliability of the satellite signal is calculated based on the azimuth of the satellite that has transmitted the received satellite signal and the signal strength of the satellite signal. With regard to the signal strength of the satellite signal, a reflected wave is weaker than a direct wave in a multipath environment, for example. In a building, the signal strength of the satellite signal is weaker in the direction of a signal blocking object (e.g., wall) than in the signal propagation direction such as on the window side. Therefore, calculation of a novel index taking the azimuth of the satellite (satellite constellation) and the reception environment (signal strength) into consideration can be implemented.

The index value calculation method may further include calculating a deflection value of the received satellite signals as the index by performing a weighted calculation while weighting the given azimuth of each of the satellites based on the given signal strength of each of the received satellite signals.

The calculation circuit may further include an overall deflection value calculation section that calculates a deflection value of the received satellite signals by performing a weighted calculation while weighting the given azimuth of each of the satellites based on the given signal strength of each of the received satellite signals.

According to the above configuration, the deflection value of the received satellite signals is calculated by the weighted calculation in which the azimuth of each satellite is weighted based on the given signal strength of the received satellite signal. Therefore, the azimuth and the degree of deflection of the received satellite signals can be determined from the calculated deflection value, whereby a novel index differing from the DOP which is an index of the satellite constellation can be calculated.

In the index value calculation method, the calculating of the deflection value of the received satellite signals may include calculating a deflection azimuth and a deflection strength of the received satellite signals as the deflection value.

In the index value calculation method, the calculating of the deflection value of the received satellite signals may include:

changing a weighting coefficient for a signal strength of a satellite signal depending on a present positioning mode among a plurality of positioning modes predetermined for a positioning calculation section; and calculating the weighting coefficient for the given signal strength of each of the received satellite signals based on a relationship between the signal strength of the satellite signal and the weighting coefficient that has been changed, the deflection value of the received satellite signals may be calculated by performing the weighted calculation while weighting the given azimuth of a corresponding satellite among the satellites with the calculated weighting coefficient.

In the calculation circuit, the overall deflection value calculation section may calculate a deflection azimuth and a deflection strength of the received satellite signals as the deflection value.

In the calculation circuit, the overall deflection value calculation section may include:

a correspondence coefficient change section that changes a weighting coefficient for a signal strength of a satellite signal depending on a present positioning mode among a plurality of positioning modes predetermined for a positioning calculation section; and a coefficient calculation section that calculates the weighting coefficient for the given signal strength of each of the received satellite signals based on a relationship between the signal strength of the satellite signal and the weighting coefficient that has been changed by the correspondence coefficient change section, the overall deflection value calculation section may perform the weighted calculation while weighting the given azimuth of a corresponding satellite among the satellites with the calculated weighting coefficient.

According to the above configuration, the relationship with the weighting coefficient when performing the weighted calculation for the signal strength of the satellite signal is changed depending on the positioning mode. For example, when the positioning calculation mode changes depending on the field intensity of the received signal, an appropriate weighting coefficient corresponding to the positioning mode can be obtained.

In the index value calculation method, the changing of the weighting coefficient may include changing the relationship between the signal strength and the weighting coefficient so that the weighting coefficient for an identical signal strength increases when the present positioning mode is a mode that is appropriate for positioning in a weaker electric field environment.

In the calculation circuit, the correspondence coefficient change section may change the relationship between the signal strength and the weighting coefficient so that the weighting coefficient for an identical signal strength increases when the present positioning mode is a mode that is appropriate for positioning in a weaker electric field environment.

When the positioning mode has been changed to the positioning mode in a weaker field environment, it is considered that the signal strength of the received satellite signal has decreased. Therefore, the weighting coefficient can be increased in a reception environment with a weaker electric field, even if the signal strength is the same.

In the index value calculation method, the calculating of the deflection value of the received satellite signals may include:

variably setting an adjustment coefficient that adjusts a degree of deflection of each of the received satellite signals; and performing the weighted calculation while weighting the given azimuth of each of the satellites based on the adjustment coefficient that has been set in addition to the weighting based on the given signal strength of each of the received satellite signals.

In the calculation circuit, the overall deflection value calculation section may include an adjustment coefficient setting section that variably sets an adjustment coefficient that adjusts a degree of deflection of each of the received satellite signals, the overall deflection value calculation section may perform the weighted calculation while weighting the given azimuth of each of the satellites based on the adjustment coefficient set by the adjustment coefficient setting section in addition to the weighting based on the given signal strength of each of the received satellite signals.

According to the above configuration, the weighted calculation is performed while weighting the azimuth of each satellite based on the adjustment coefficient which is variably set in addition to weighting based on the signal strength of the received satellite signal. Therefore, an index corresponding to a more minute change in the reception environment can be calculated by changing the adjustment coefficient depending on the reception environment, for example.

In the index value calculation method, the variably setting of the adjustment coefficient may include changing the adjustment coefficient depending on the number of received satellite signals.

According to a further embodiment of the invention, there is provided an satellite signal selection method comprising selecting a satellite signal that is appropriate or inappropriate for positioning calculations from the received satellite signals based on the deflection value of the received satellite signals calculated by the above index value calculation method.

In the calculation circuit, the adjustment coefficient setting section may change the adjustment coefficient depending on the number of received satellite signals.

According to the above configuration, a satellite signal that is appropriate or inappropriate for the positioning calculation is selected from the received satellite signals based on the calculated deflection value of the satellite signals. Therefore, more accurate positioning calculations using a novel index can be achieved, such as performing positioning calculations while excluding the satellite signal of the satellite of which the azimuth obviously differs from the calculated deflection value of the satellite signals, for example.

The satellite signal selection method may further include selecting a satellite signal transmitted from a satellite positioned in an azimuth opposite to a deflection azimuth of the calculated deflection value as the satellite signal that is inappropriate for the positioning calculations.

According to still another embodiment of the invention, there is provided a satellite appropriateness calculation method comprising calculating positioning appropriateness of each of the received satellite signals based on the deflection value calculated by the above index value calculation method and the given azimuth of each of the satellites.

According to the above configuration, the positioning appropriateness (index) of each satellite signal is calculated based on the calculated deflection value of the satellite signals and the azimuth of each satellite. The DOP is an index of the entire satellite constellation. According to the above configuration, the index of each satellite signal is calculated.

The satellite appropriateness calculation method may further include calculating the positioning appropriateness of each of the satellite signal transmitted from each of the satellites based on a distance between a plotted point of the deflection value and a plotted point of each of the satellites when plotting the deflection value calculated by the index value calculation method inside a unit circle of which a direction from its center indicates an azimuth and plotting each of the satellites on a circumference of the unit circle at a position corresponding to the azimuth of each of the satellites.

According to the above configuration, the relative index of each satellite signal is calculated as the positioning appropriateness based on the deflection value of the received satellite signals. Therefore, a standard for determining whether the satellite signals are relatively appropriate or inappropriate in the present reception environment can be indicated by a numerical value.

According to a still further embodiment of the invention, there is provided a satellite signal selection method comprising selecting a satellite signal that is appropriate or inappropriate for positioning calculations based on the positioning appropriateness of each of the satellite signals calculated by the above satellite appropriateness calculation method.

According to the above configuration, a satellite signal that is appropriate or inappropriate for the positioning calculation is selected based on the calculated appropriateness of each satellite signal.

According to still another embodiment of the invention, there is provided a positioning device comprising an index calculation section that calculates an index based on given azimuths of satellites that have transmitted received satellite signals for positioning and given signal strengths of the received satellite signals, the index indicating reliability of the received satellite signals, the positioning device performing positioning calculations while selecting satellite signals used for positioning from the received satellite signals based on the index calculated by the index calculation section.

According to the above configuration, the positioning calculation is performed after selecting the satellite signal used for positioning based on the calculated index. Specifically, more accurate positioning calculations taking the azimuth of the satellite (satellite constellation) and the reception environment (signal strength) into consideration can be performed using a novel index.

Embodiments of the invention are described below with reference to the drawings. Note that the embodiments described below do not in any way limit the scope of the invention laid out in the claims. Note that all elements of the embodiments described below should not necessarily be taken as essential requirements for the invention.

The following description illustrates a portable phone which is an electronic instrument including a positioning device. Note that the embodiments to which the invention may be applied are not limited thereto.

A portable phone 1 according to one embodiment of the invention has a telephone call function. The portable phone 1 also has a navigation function utilizing a built-in positioning device, such as plotting the present position of the portable phone 1 located by the positioning device on a map and displaying the plotted position on a display. A positioning circuit calculates the present position by performing calculations based on GPS satellite signals received from a plurality of (e.g., four or more) GPS satellites.

Configuration

FIG. 1 is a block diagram showing the internal configuration of the portable phone 1. As shown in FIG. 1, the portable phone 1 includes a GPS antenna 10, a GPS receiver section 20 (positioning device), a host central processing unit (CPU) 41, an operation section 42, a display section 43, a read only memory (ROM) 44, and a random access memory (RAM) 44.

The GPS antenna 10 is an antenna which receives an RF signal including a GPS satellite signal transmitted from a GPS satellite, and outputs the received RF signal.

The GPS receiver section 20 acquires/extracts the GPS satellite signal from the RF signal received by the GPS antenna 10, and calculates the present position of the portable phone 1 by performing positioning calculations based on a navigation message extracted from the GPS satellite signal and the like. The GPS receiver section 20 includes a surface acoustic wave (SAW) filter 21, a low-noise amplifier (LNA) 22, a radio frequency (RF) receiver circuit section 23, a temperature-compensated crystal oscillator (TCXO) 24, and a baseband process circuit section 30. The RF receiver circuit section 23 and the baseband process circuit section 30 of the GPS receiver section 20 may be produced as different large scale integrated (LSI) circuits, or may be produced in one chip. The entire GPS receiver section 20 including the SAW filter 21, the LNA 22, and the TCXO 24 may be produced in one chip.

The SAW filter 21 is a bandpass filter. The SAW filter 21 allows a specific band component of the RF signal input from the GPS antenna 10 to pass through while blocking a frequency component outside the specific band, and outputs the resulting signal. The LNA 22 is a low-noise amplifier. The LNA 22 amplifies the signal input from the SAW filter 21, and outputs the amplified signal. The TCXO 24 is a temperature-compensated crystal oscillator. The TCXO 24 generates an oscillation signal having a specific oscillation frequency, and outputs the generated oscillation signal. The RF receiver circuit section 23 multiplies the signal input from the LNA 22 by a signal obtained by dividing or multiplying the frequency of the oscillation signal input from the TCXO 24 to convert (down-convert) the signal input from the LNA 22 into an intermediate-frequency signal (IF signal), amplifies the IF signal, converts the amplified signal into a digital signal by A/D conversion, and outputs the resulting digital signal.

The baseband process circuit section 30 is a circuit section which acquires/tracks the GPS satellite signal from the IF signal input from the RF receiver circuit section 23, and performs pseudo-range calculations, positioning calculations, and the like based on a navigation message, time information, and the like extracted by decoding the data. The baseband process circuit section 30 includes a signal acquisition/tracking section 31, a CPU 32, a ROM 35, and a RAM 36.

The signal acquisition/tracking section 31 acquires the GPS satellite signal based on the IF signal input from the RF receiver circuit section 23. The signal acquisition/tracking section 31 acquires the GPS satellite signal by extracting the GPS satellite signal from the IF signal by performing a correlation process on the IF signal. Specifically, the signal acquisition/tracking section 31 correlates the IF signal with a pseudo-generated C/A code replica (code replica), and accumulates correlation values (processing results) to calculate a correlation cumulative value. This allows the phases of the C/A code and a carrier frequency contained in the GPS satellite signal to be obtained.

After acquiring the GPS satellite signal, the signal acquisition/tracking section 31 tracks the acquired GPS satellite signal. The signal acquisition/tracking section 31 tracks the GPS satellite signals by synchronously holding the acquired GPS satellite signals in parallel. For example, the signal acquisition/tracking section 31 performs a code loop which is implemented by a delay locked loop (DLL) and tracks the phase of the C/A code and a carrier loop which is implemented by a phase locked loop (PLL) and tracks the phase of the carrier frequency.

The CPU 32 controls each section of the baseband process circuit section 30. The CPU 32 decodes data contained in each GPS satellite signal acquired and tracked by the signal acquisition/tracking section 31 to extract a navigation message, and performs pseudo-range calculations, positioning calculations, and the like to locate the present position. The CPU 32 includes a BOP calculation section 33 and a positioning calculation section 34.

The BOP calculation section 33 calculates a BOP of the GPS satellite acquired by the signal acquisition/tracking section 31. The term "BOP" refers to an index indicating the reliability of the satellite signal of the acquired satellite (hereinafter referred to as "acquired satellite signal"). The BOP is classified as an overall BOP which is an index indicating a deflection value (direction (azimuth) and degree of deflection) of the acquired satellite signals, and an individual BOP which is an index indicating the positioning appropriateness of each acquired satellite signal. The overall BOP and the individual BOP are respectively calculated as numerical values.

Calculation principles of the overall BOP and the individual BOP is described below. The individual BOP is calculated after the overall BOP has been calculated. The calculation principle of the overall BOP is as follows. First, a gain G of each acquired satellite signal is calculated. The gain G is given by the following equation (1):

$$G = (S/P2)^{P1} \tag{1}$$

where, S indicates the signal strength of the acquired satellite signal (received signal). P1 and P2 indicate weighting coefficients for the signal strength of the satellite signal. The coefficients P1 and P2 are values determined depending on a positioning mode.

The term "positioning mode" refers to a mode which indicates the reception environment. In this embodiment, the positioning mode is classified as a first positioning mode and a second positioning mode. The first positioning mode is a positioning mode when the field intensity (signal strength) of the received signal is weak (e.g., positioning in a room). The second positioning mode is a positioning mode when the field intensity of the received signal is strong as compared with the first positioning mode (e.g., positioning in the open air).

Figures 2, 3:
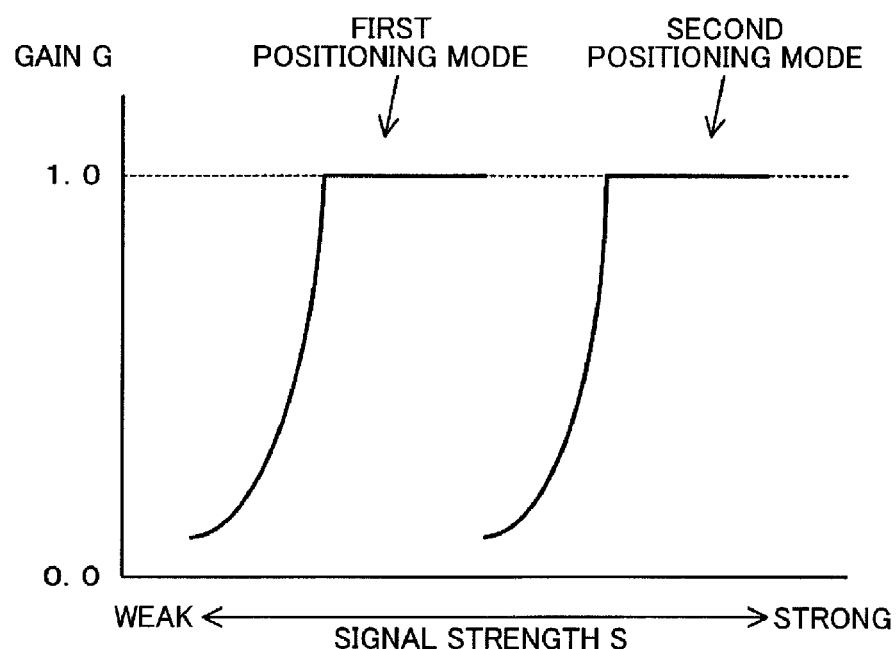
FIG. 2 shows a setting example of coefficients P1 and P2.
FIG. 3 shows an example of the relationship between signal strength and gain.

FIG. 2 shows an example of setting values of the coefficients P1 and P2. The coefficients P1 and P2 are determined so that the signal strength S and the gain G satisfy the relationship shown in FIG. 3, for example. FIG. 3 shows a graph which indicates the relationship between the signal strength S and the gain G in the first positioning mode and the second positioning mode, wherein the horizontal axis indicates the signal strength S, and the vertical axis indicates the gain G. The value of the gain G is set to be 0.0 to 1.0. Therefore, when the gain G calculated by the equation (1) exceeds the upper limit (1.0), the gain G is corrected to be 1.0.

Figure 4:
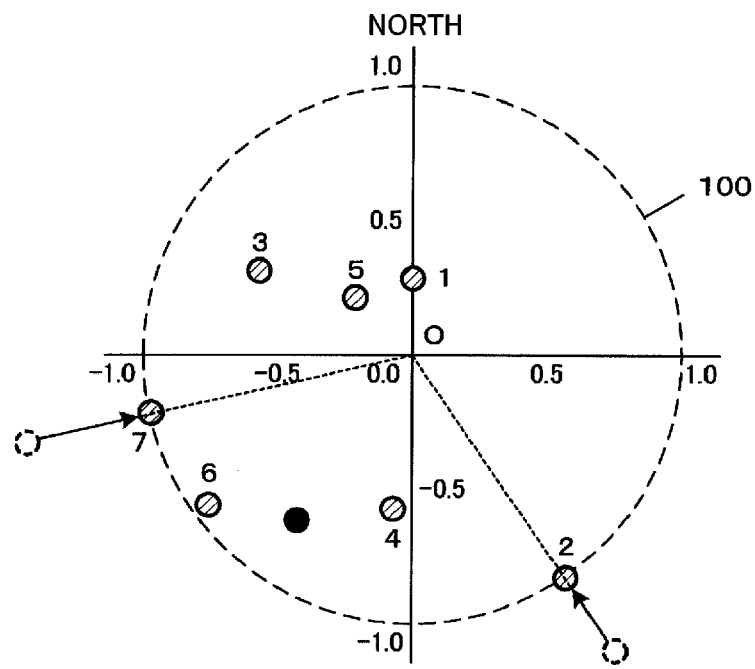
FIG. 4 is a view illustrative of calculation of an overall BOP.

The vector coordinates of each acquired satellite signal are then calculated. When the starting point of a vector of which the direction is the azimuth based on the present position and the magnitude is a magnitude R corresponding to the gain G of the acquired satellite signal is placed at the present position, the term "vector coordinates" of the acquired satellite signal refers to the coordinates of the end point of the vector. Specifically, the term "vector coordinates" refers to an index of each acquired satellite signal. FIG. 4 shows an example of the vector coordinates of the acquired satellite signal. FIG. 4 shows a state in which the vector coordinates of each acquired satellite signal are plotted in a two-dimensional coordinate plane of which the origin O is the present position. The upward direction indicates the north, the downward direction indicates the south, the rightward direction indicates the east, and the leftward direction indicates the west. The vector coordinates of seven acquired satellites are plotted in FIG. 4. Numerals provided near the respective vector coordinates indicate the satellite numbers (1 to 7) of the acquired satellites.

The vector coordinates are calculated as coordinates positioned at a distance R given by the following equation (2) from the origin O in the direction (azimuth) of the acquired satellite based on the present position. Therefore, the vector coordinates may also be referred to as polar coordinates (azimuth of acquired satellite, distance R).

$$R = \text{gain } G \times P3 \tag{2}$$

Where, P3 indicates an adjustment coefficient which adjusts the degree of deflection of the satellite signal. In this embodiment, the coefficient P3 is determined depending on the number of acquired satellites.

Figure 5:
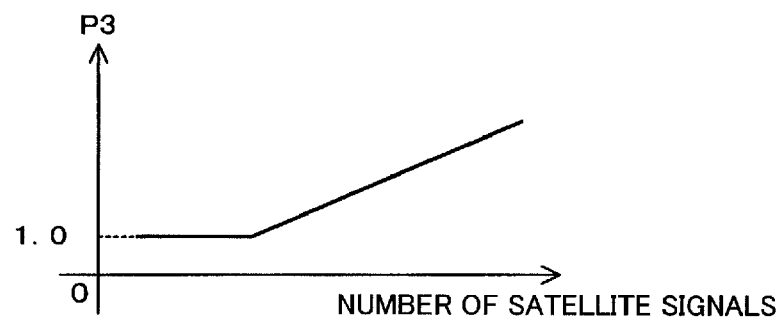
FIG. 5 shows an example of the relationship between the number of acquired satellites and a coefficient P3.

FIG. 5 shows a graph which indicates an example of the relationship between the coefficient P3 and the number of acquired satellites. In FIG. 5, the horizontal axis indicates the number of acquired satellites, and the vertical axis indicates the coefficient P3. As shown in FIG. 5, the value of the coefficient P3 is 1.0 or more. The coefficient P3 is determined to increase as the number of acquired satellites increases.

The vector coordinates are determined to be located inside a unit circle 100 around the origin O. When the calculated vector coordinates are located outside the unit circle 100 (i.e., the magnitude R exceeds one), the vector coordinates are corrected to be located on the circumference of the unit circle 100 (i.e., R=1). Specifically, the vector coordinates are corrected to be located at a position on the circumference of the unit circle 100 at which the circumference of the unit circle 100 intersects the direction from the origin O toward the position at the vector coordinates.

The overall BOP is then calculated by adding up the vector coordinates of each acquired satellite signal as a whole. Specifically, the sum of the vectors from the origin O toward the vector coordinates of the acquired satellite signals is calculated, and the coordinates of the calculated vector sum are taken as the position of the overall BOP. The overall BOP is determined to be located inside the unit circle 100. When the calculated overall BOP is located outside the unit circle 100, the overall BOP is corrected to be located at a position on the circumference of the unit circle 100. Specifically, the overall BOP is corrected to be located at a position on the circumference of the unit circle 100 at which the circumference of the unit circle 100 intersects the direction from the origin O toward the position of the calculated overall BOP.

The overall BOP thus calculated indicates the deflection (deflection value) of the acquired satellite signals. Specifically, the direction of the overall BOP observed from the origin O (present position) in the two-dimensional coordinate plane indicates the deflection direction (deflection azimuth), and the distance from the origin indicates the degree of deflection (deflection strength). Therefore, the direction and the degree of deflection of the acquired satellite signals can be determined from the calculated overall BOP. Specifically, since the radio waves of the acquired satellite signals as a whole are strong from the direction (azimuth) of the overall BOP, it can be determined that there is a high possibility that this direction (azimuth) is a direction from which the GPS satellite signals are directly transmitted. It can be determined that there is a high possibility that an object which blocks the GPS satellite signal (e.g., wall or building) exists in the direction (azimuth) opposite to the position of the overall BOP so that the acquired satellite signal transmitted from this direction is affected by a multipath and the like. On the other hand, when the position of the overall BOP is close to the origin O, it can be determined that the degree of deflection of the acquired satellite signals is small. This means that the GPS satellite reception environment is similar in all azimuths.

Figure 6:
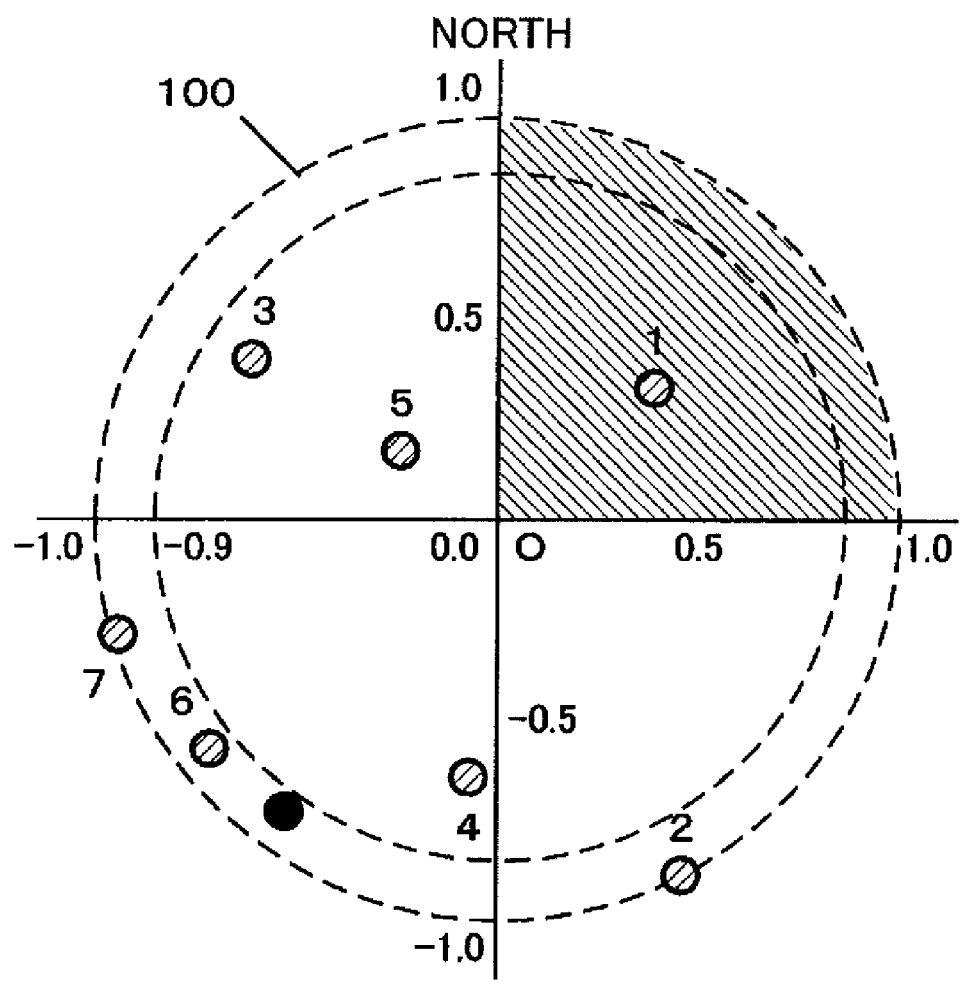
FIG. 6 is a view illustrative of determination of an inappropriate acquired satellite based on an overall BOP.

Therefore, when the degree of deflection of the acquired satellite signals determined from the overall BOP is large, a satellite signal transmitted from the direction opposite to the deflection direction is preferably excluded as being inappropriate for positioning calculations. In this embodiment, determination of exclusion is made as follows. As shown in FIG. 6, when the absolute value of the overall BOP is equal to or larger than a specific value (e.g., "0.9"), the acquired satellite signal located in the quadrant in the direction opposite to the direction of the overall BOP is determined to be inappropriate for positioning calculations. In FIG. 6, the direction of the overall BOP is the southwest direction (third quadrant), and the acquired satellite signal in the northeast direction (first quadrant) opposite to the southwest direction is determined to be inappropriate for positioning calculations.

Figure 7:
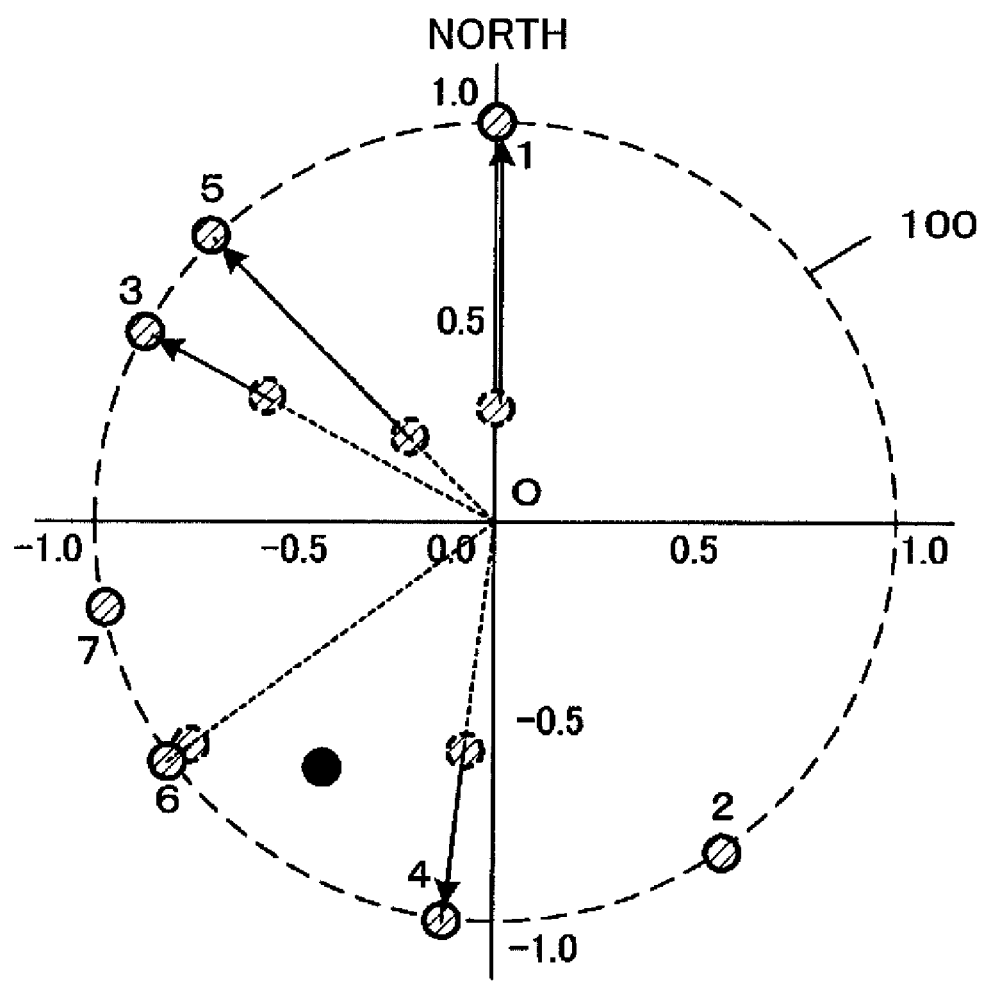
FIG. 7 is a view illustrative of calculation of an individual BOP value.

The calculation principle of the individual BOP is described below. As described above, the individual BOP is an index of each acquired satellite signal, and is calculated as the positioning appropriateness of each acquired satellite signal. Since the individual BOP is expressed by one value, differing from the overall BOP, the value of the individual BOP is hereinafter referred to as "individual BOP value". As shown in FIG. 7, the vector coordinates of each acquired satellite signal are moved to the circumference of the unit circle 100. Specifically, the position of each vector coordinate is changed to a position on the circumference of the unit circle 100 at which the circumference of the unit circle 100 intersects the direction from the origin O toward the vector coordinates.

Figure 8:
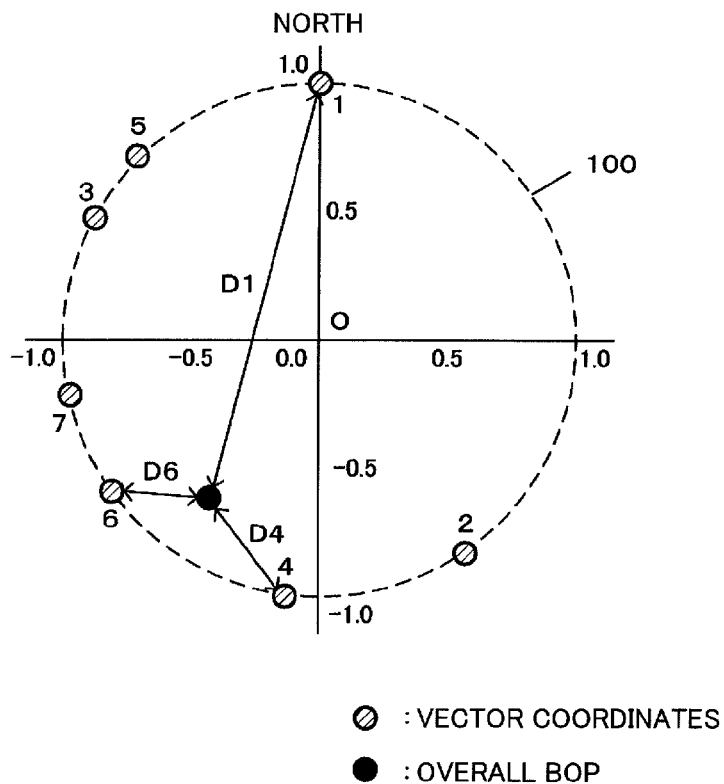
FIG. 8 is a view illustrative of calculation of an individual BOP value.

As shown in FIG. 8, a distance D between each vector coordinate after being moved and the position of the overall BOP is calculated. The individual BOP value is calculated by the following equation (3).

$$\text{Individual } BOP \text{ value} = 1 - D/2 \qquad (3)$$

Since all of the vector coordinates are located on the circumference of the unit circle 100 and the overall BOP is located inside the unit circle 100 including the circumference, the distance D is in the range of 0.0 to 2.0.

Therefore, the individual BOP value is in the range of 0.0 to 1.0.

Figure 9:
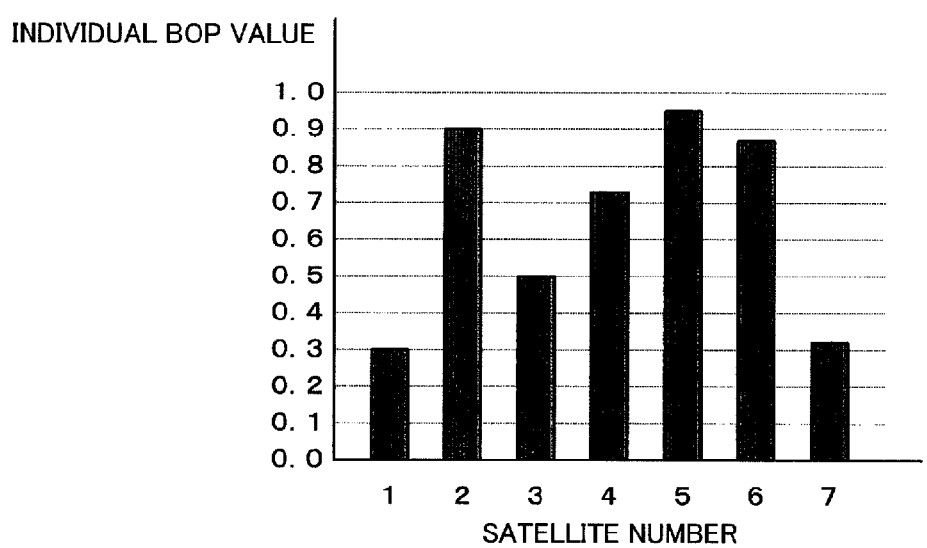
FIG. 9 shows an example of an individual BOP value.

The larger the individual BOP value, the higher the reliability. Specifically, the overall BOP indicates the direction and the degree of deflection of the acquired satellite signals as a whole. As the direction of one acquired satellite signal becomes closer to the direction of deflection of the acquired satellite signals as a whole, the distance D between the vector coordinates of that acquired satellite signal and the overall BOP becomes shorter. Therefore, the individual BOP value becomes closer to 1.0. On the other hand, as the direction of one acquired satellite signal becomes closer to the direction opposite to the direction of deflection of the acquired satellite signals as a whole, the distance D between the vector coordinates of that acquired satellite signal and the overall BOP becomes longer. Therefore, the individual BOP value becomes closer to 0.0. FIG. 9 shows a graph which indicates an example of the individual BOP value calculated from the vector coordinates of each acquired satellite signal shown in FIG. 8.

As shown in FIG. 8, each acquired satellite signal is located on the circumference of the unit circle 100, and the overall BOP is located inside the unit circle 100 including the circumference. Specifically, when the acquisition target signals as a whole are not deflected, the overall BOP is located at the origin O, and the individual BOP value of each acquired satellite signal equally becomes 0.5. The position of the overall BOP moves away from the origin O as the degree of deflection of the signals increases, and the individual BOP value of each acquired satellite signal varies to a larger extent. Therefore, an acquired satellite signal with an individual BOP value of 3.0 or less may be determined to have low reliability as the standard relating to the individual BOP value when determining the reliability of each acquired satellite signal, for example.

Figure 10A:
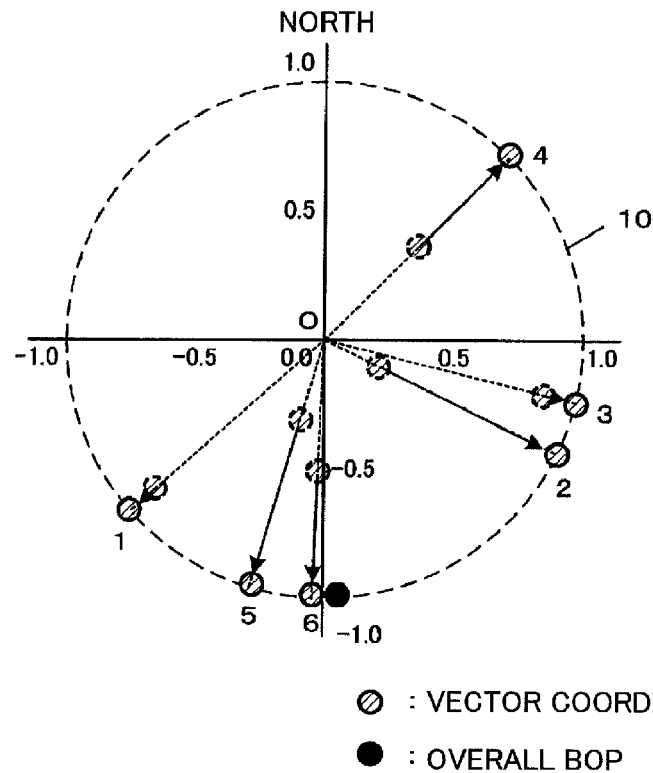
FIGS. 10A and 10B show an example of a BOP when locating a position in a room.
Figure 10B:
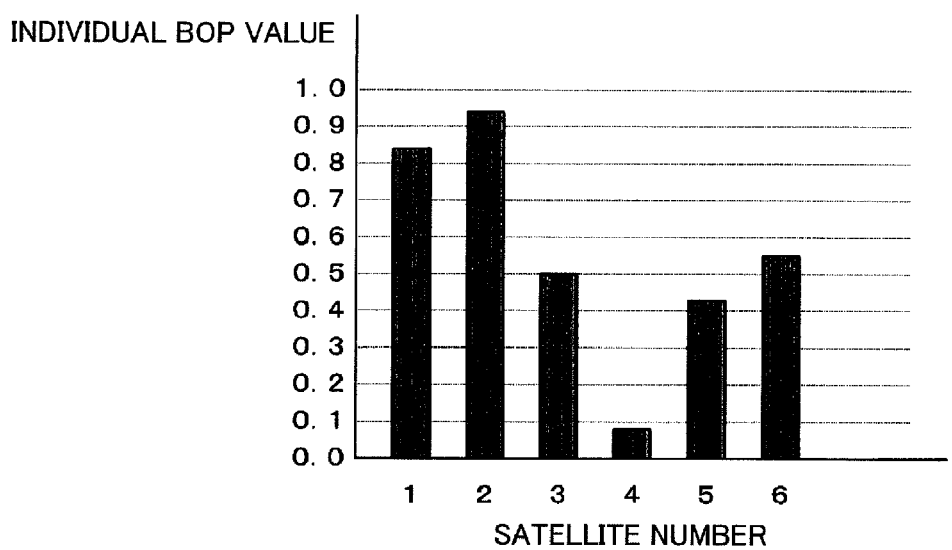

FIGS. 10A and 10B and FIGS. 11A and 11B are views showing examples of the BOP in different reception environments. FIGS. 10A and 10B are views showing an example of the BOP when locating a position in a room having a south window. FIG. 10A shows the vector coordinates of each acquired satellite signal and the overall BOP, and FIG. 10B shows a graph of the individual BOP value of each acquired satellite signal. As shown in FIG. 10A, the overall BOP is located on the circumference of the unit circle 100 and positioned south. Specifically, the acquired satellite signals as a whole are deflected to the south to a large extent. In more detail, the direction of each acquired satellite signal excluding the acquired satellite signal having the satellite number 4 is south. This means that the GPS satellite signals from the GPS satellites positioned to the south where the window is provided are mainly received. In other words, it can be determined that there is a possibility that an object which blocks the GPS satellite signal (e.g., wall) exists in the north direction so that the signal received from the GPS satellite positioned in the north direction has a low reliability due to the effects of a multipath and the like. As shown in FIG. 10B in which the individual BOP values of the acquired satellite signals are compared, the individual BOP value of the satellite number 4 is low (i.e., reliability is low). In this case, the reliability of the located position is significantly increased by performing positioning calculations while excluding the satellite signal of the satellite number 4.

Figure 11A:
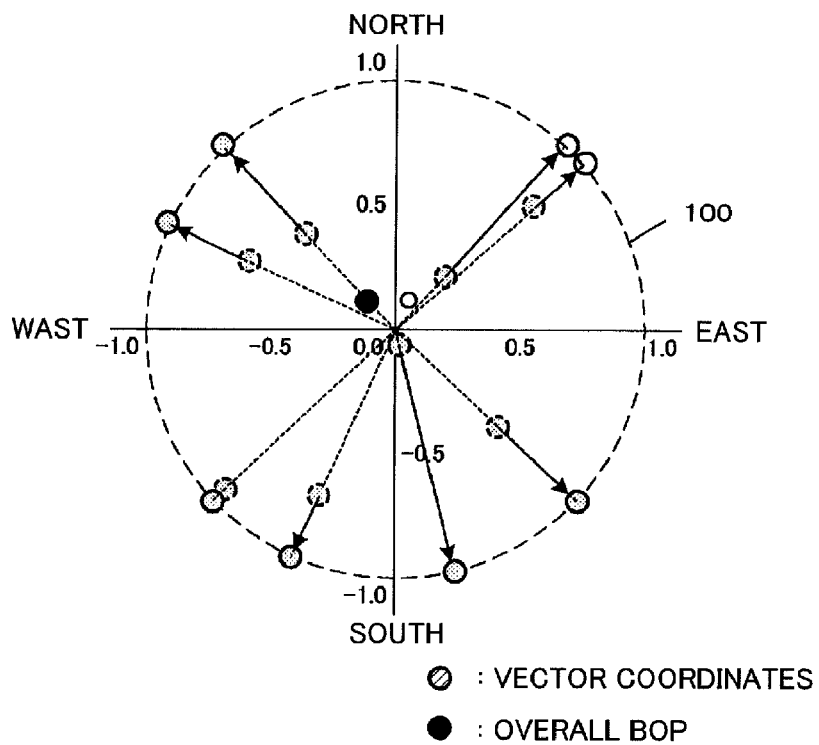
FIGS. 11A and 11B show an example of a BOP when locating a position in the open air.
Figure 11B:
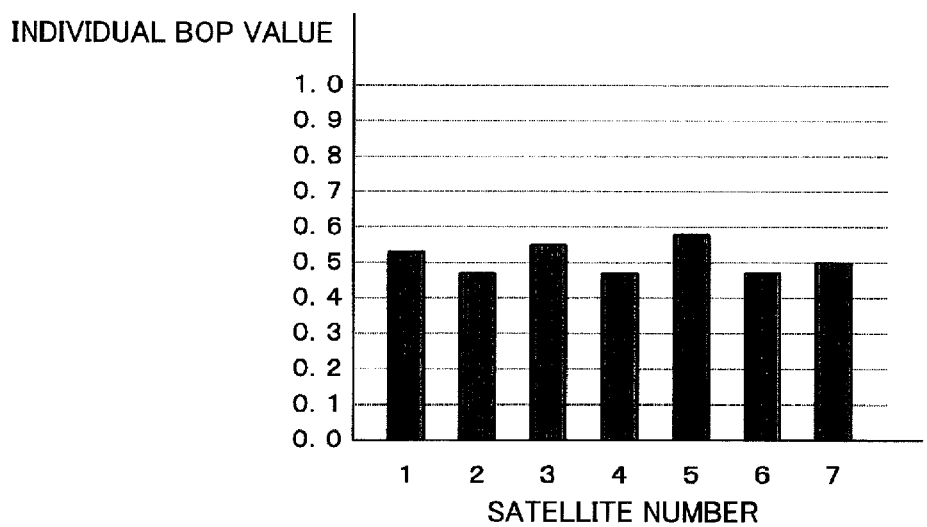

FIGS. 11A and 11B are views showing an example of the BOP when locating a position in the open air. FIG. 11A shows the vector coordinates of each acquired satellite signal and the overall BOP, and FIG. 11B shows a graph of the individual BOP value of each acquired satellite signal. As shown in FIG. 11A, the overall BOP is deflected to the north to some extent, but is located near the origin O. Specifically, the acquired satellite signals as a whole are deflected to only a small extent so that the GPS satellite signals are received from all azimuths. As shown in FIG. 11B, the individual BOP value of each acquired satellite signal is almost the same, and it is detected that an acquired satellite signal with a low reliability does not exist.

Again referring to FIG. 1, the positioning calculation section 34 performs pseudo-range calculations and positioning calculations based on the orbit information and the time information of each GPS satellite decoded from each GPS satellite signal acquired/tracked by the signal acquisition/tracking section 31 to locate the present position. The positioning calculation section 34 performs positioning calculations using only the acquired GPS satellite signals which have been determined to be appropriate for positioning calculations by the BOP calculation section 33.

The ROM 35 stores a system program for the CPU 32 to control the baseband process circuit section 30, and a program and data for the CPU 32 to execute various processes including a baseband process.

FIG. 12 is a view showing the configuration of the ROM 35. As shown in FIG. 12, the ROM 35 stores a baseband process program 110 and coefficient setting data 121.

The coefficient setting data 121 includes data which defines the values of the coefficients P1 and P2 used when the BOP calculation section 33 calculates the BOP and data which defines the value of the coefficient P3. Specifically, the ROM 35 stores a data table in which the values of the coefficients P1 and P2 are stored while being associated with each positioning mode (see FIG. 2) as the data relating to the coefficients P1 and P2. The ROM 35 stores a data table in which the value of the coefficient P3 is associated with the function formula of the graph indicating the relationship between the number of acquisition target satellites and the coefficient P3 or with the number of acquisition target satellites (see FIG. 5) as the data relating to the coefficient P3.

The RAM 36 is used as a work area for the CPU 32. The RAM 36 temporarily stores a program and data read from the ROM 35, data input from the RF receiver circuit section 23, calculation results of the CPU 32 based on various programs, and the like.

FIG. 13 is a view showing the configuration of the RAM 36. As shown in FIG. 13, the RAM 36 stores positioning mode data 131, acquired satellite data 133, vector coordinate data 135, overall BOP data 137, and individual BOP value data 139. The positioning mode data 131 is data indicating the present positioning mode.

The acquired satellite data 133 is data relating to the present acquired satellites. FIG. 14 is a view showing an example of the data configuration of the acquired satellite data 133. As shown in FIG. 14, a satellite number 133*a*, a position 133*b*, a moving velocity 133*c*, a moving direction 133*d*, and a signal strength 133*e* are stored as the acquired satellite data 133 in acquired satellite units while being associated with one another. The position 133*b* and the moving direction 133*d* are expressed by three-dimensional coordinates in the international terrestrial reference frame. Note that the position 133*b* and the moving direction 133*d* may also be expressed using other methods such as latitude, longitude, and height.

Figures 15, 16, 17:
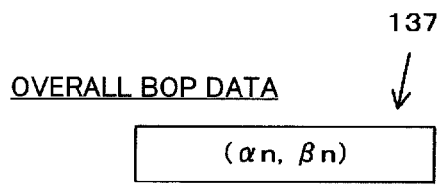
FIG. 15 shows a data configuration example of vector coordinate data.
FIG. 16 shows a data configuration example of overall BOP data.
FIG. 17 shows a data configuration example of individual BOP value data.

FIG. 15 is a view showing an example of the data configuration of the vector coordinate data 135. As shown in FIG. 15, a satellite number 135*a*, a calculated gain 135*b*, and vector coordinates 135*c* are stored as the vector coordinate data 135 in acquired satellite units while being associated with one another. The vector coordinate data 135 is updated each time the BOP calculation section 33 calculates the BOP.

FIG. 16 is a view showing an example of the data configuration of the overall BOP data 137. As shown in FIG. 16, the vector coordinates of the calculated overall BOP are stored as the overall BOP data 137. The overall BOP data 137 is updated each time the BOP calculation section 33 calculates the overall BOP.

FIG. 17 is a view showing an example of the data configuration of the individual BOP value data 139. As shown in FIG. 17, a satellite number 139*a*, a calculated individual BOP value 139B, and an inappropriateness flag 139*c* are stored as the individual BOP value data 139 in acquired satellite units. The inappropriateness flag 139*c* is a flag indicating whether or not the signal received from the corresponding acquired satellite is inappropriate for positioning calculations. The inappropriateness flag 139*c* is set at "1" when the signal received from the corresponding acquired satellite is inappropriate for positioning calculations. The individual BOP value data 139 is updated each time the BOP calculation section 33 calculates the individual BOP.

Again referring to FIG. 1, the host CPU 41 controls each section of the portable phone 1 based on various programs such as the system program stored in the ROM 44. Specifically, the host CPU 41 mainly implements a telephone call function, and performs a process which implements various functions including a navigation function such as causing the display section 43 to display a navigation screen in which the present position of the portable phone 1 input from the baseband process circuit section 30 is plotted on a map.

The operation section 42 is an input device including an operation key, a button switch, and the like. The operation section 42 outputs an operation signal corresponding to an operation of the user to the host CPU 41. The display section 43 is a display device including a liquid crystal display (LCD) or the like. The display section 43 displays a display screen based on a display signal input from the host CPU 41.

The ROM 44 stores a system program for the host CPU 41 to control the portable phone 1 and an application program and data for the host CPU 41 to implement various functions including the navigation function. The RAM 45 is used as a work area for the host CPU 41. The RAM 45 temporarily stores the program and data read from the ROM 44, operation data input from the operation section 42, calculation results of the host CPU 41 based on various programs, and the like.

The portable phone wireless communication section 46 is a known communication circuit section implemented by an antenna through which a radio signal is transmitted and received the between the portable phone 1 and a radio base station installed by a portable phone communication service provider, an RF conversion circuit, and the like, and transmits and receives a radio signal under control of the host CPU 41.

Operation

Figure 18:
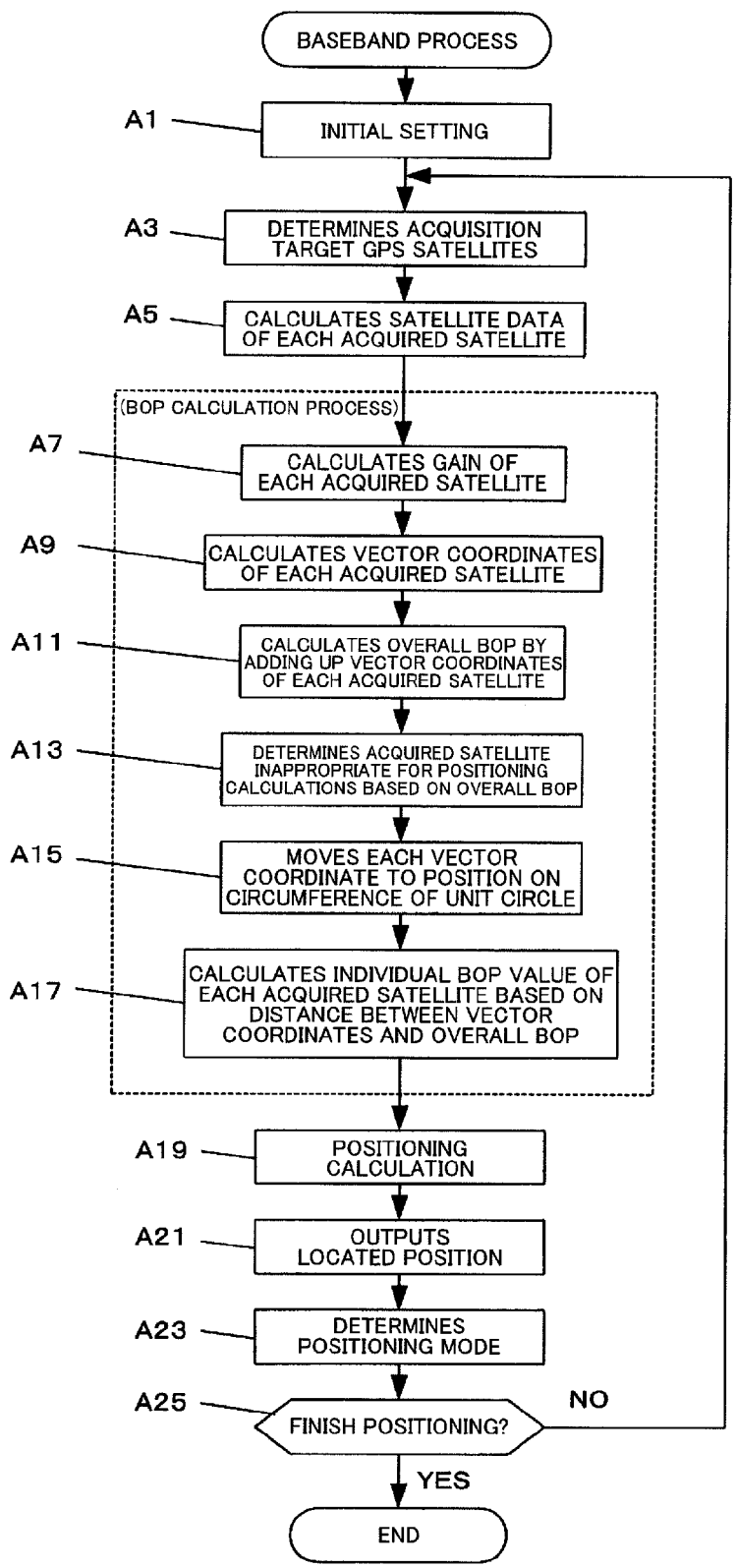
FIG. 18 is a flowchart of the flow of a baseband process.

FIG. 18 is a flowchart illustrative of the flow of a baseband process. This process is implemented by causing the CPU 32 to execute a process based on the baseband process program 110 stored in the ROM 35.

As shown in FIG. 18, the CPU 32 performs an initial setting (step A1). Specifically, the CPU 32 acquires the present approximate position and approximate orbit information from a server or a portable telephone base station of a service provider of the portable phone 1, for example. The CPU 32 also sets the present positioning mode to be a predetermined initial positioning mode. The present positioning mode is stored as the positioning mode data 131.

The CPU 32 then determines the GPS satellites from which the GPS satellite can be received at the present approximate position or the previous located position based on the approximate orbit information and the orbit information of the GPS satellites such as an almanac, and determines the acquisition target GPS satellites, such as adding a new acquisition target GPS satellite or excludes s GPS satellite considered to be positioned outside the acquisition range from the acquisition target satellites (step A3).

The CPU 32 decodes the navigation message from the GPS satellite signal acquired/tracked by the signal acquisition/tracking section 31, calculates the position, the moving velocity, the moving direction, and the like of each acquisition target GPS satellite (acquired satellite) based on the decoded navigation message, and calculates the strength of the signal received from each acquired satellite. The calculated values are stored as the acquired satellite data 133 (step A5).

The BOP calculation section 33 then performs a BOP calculation process. Specifically, the BOP calculation section 33 determines the values of the coefficients P1 and P2 based on the present positioning mode referring to the coefficient setting data 121. The BOP calculation section 33 then refers to the acquired satellite data 133, and calculates the gain G according to the equation (1) in acquired satellite units based on the signal strength S and the determined coefficients P1 and P2 (step A7).

The BOP calculation section 33 then calculates the vector coordinates of each acquired satellite signal. Specifically, the BOP calculation section 33 determines the value of the coefficient P3 based on the present number of acquired satellites referring to the coefficient setting data 121. The BOP calculation section 33 then refers to the acquired satellite data 133, calculates a vector of which the direction coincides with the direction of the acquired satellite and the magnitude R is given by the equation (2), and determines the coordinates of the calculated vector to be the vector coordinates of the acquired satellite signal. When the magnitude R is equal to or larger than the radius of the unit circle 100, the BOP calculation section 33 calculates the vector coordinates after correcting the magnitude R to be the radius of the unit circle (step A9). The calculated gain G and vector coordinates are stored as the vector coordinate data 135.

The BOP calculation section 33 then calculates the overall BOP by adding up the calculated vector coordinates. When the calculated overall BOP is located outside the unit circle 100 around the present position as the origin O, the BOP calculation section 33 corrects the overall BOP to be located at a position on the circumference of the unit circle 100 at which the circumference of the unit circle 100 intersects the direction from the origin O toward the position of the overall BOP (step A11). The calculated overall BOP is stored as the overall BOP data 137.

The BOP calculation section 33 then determines whether or not each acquired satellite is appropriate for positioning calculations (step A13). Specifically, when the distance between the origin and the overall BOP is equal to or larger than 0.9, the BOP calculation section 33 determines that the acquired satellite signal located in the quadrant in the direction opposite to the direction of the overall BOP with respect to the origin O to be inappropriate for positioning calculations. The determination result is stored as the individual BOP value data 139.

The BOP calculation section 33 then calculates the individual BOP value of each acquired satellite signal. Specifically, the BOP calculation section 33 moves the vector coordinates of the acquired satellite signal to the position on the circumference of the unit circle 100 at which the circumference of the unit circle 100 intersects the direction from the origin O toward the vector coordinates (step A15). The BOP calculation section 33 calculates the distance D between the vector coordinates after being moved and the overall BOP, and calculates the individual BOP value according to the equation (3) (step A17). The calculated individual BOP value is stored as the individual BOP value data 139. The BOP calculation process is thus completed.

After completion of the BOP calculation process, the positioning calculation section 34 refers to the individual BOP value data 139, and selects the acquired satellite signals which have been determined to be appropriate for positioning calculations from all of the acquired satellite signals. The positioning calculation section 34 then performs positioning calculations based on the orbit information, the time information, and the like included in the navigation message decoded from the selected acquired satellite signal to locate the present position (step A19). The positioning calculation section 34 outputs the calculated present position to the host CPU 41 in the subsequent stage (step A21). The CPU 32 determines the positioning mode for the next positioning based on the signal strength of each acquired satellite referring to the acquired satellite data 133, and changes the positioning mode to the determined positioning mode (step A23).

The CPU 32 then determines whether or not to finish positioning. Specifically, the CPU 32 determines that positioning should be finished when a positioning finish instruction has been input from the host CPU 41 in response to an instruction operation which turns OFF the navigation function or an instruction operation which turns OFF the power supply, for example. When the CPU 32 has determined that positioning should not be finished (step A25: NO), the CPU 32 returns to the step A3. When the CPU 32 has determined that positioning should be finished (step A25: YES), the CPU 32 finishes the process.

Effect

According to this embodiment, the overall BOP which is a novel index indicating the direction (azimuth) and the degree of deflection of the acquired satellite signals is calculated based on the azimuths and the signal strengths of the acquired satellite signals. The individual BOP value which is an index indicating the reliability of each acquired satellite signal is also calculated. More accurate positioning calculations can be achieved using these BOPs, such as by performing positioning calculations while excluding the acquired satellite signal of which the direction (azimuth) obviously differs from the calculated deflection of the satellite signals, for example.

Modification

The application of the invention is not limited to the above embodiments. Various modifications and variations may be made without departing from the scope of the invention.

(A) Determination of Appropriateness/Inappropriateness of Acquired Satellite Signal For example, whether or not each acquired satellite is appropriate for positioning calculations may be determined based on the individual BOP value. Specifically, an acquired satellite signal of which the individual BOP value is significantly lower than those of other acquired satellite signals is determined to be inappropriate for positioning calculations. For example, the deviation of the individual BOP value of each acquired satellite signal is calculated, and a signal of which the calculated deviation is equal to or smaller than a specific value is determined to be inappropriate for positioning calculations.

(B) Host CPU

For example, some or all of the processes performed by the CPU 31 of the baseband process circuit section 30 may be performed by the host CPU 41 by means of software.

(C) Electronic Instrument

The above embodiments have been described taking the case of applying the invention to a portable phone as an electronic instrument including a positioning circuit. Note that the invention may also be applied to other electronic instruments such as a personal digital assistant (PDA), a portable navigation system, and a car navigation system.

(D) Satellite Positioning System

The above embodiments have been described taking the case of utilizing the GPS. Note that the invention may also be applied to other satellite positioning systems such as the global navigation satellite system (GLONASS).

(E) Recording Medium

A configuration may be employed in which the baseband process program 110 is recorded on a recording medium such as a CD-ROM and installed in an electronic instrument including the GPS receiver section 20.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning method comprising:
   changing a weighting coefficient for a signal strength of a satellite signal depending on a present positioning mode among a plurality of positioning modes predetermined for a positioning calculation section;
   calculating the weighting coefficient for the signal strength of each of received satellite signals based on a relationship between the signal strength of the satellite signal and the weighting coefficient that has been changed;
   calculating a deflection value of the received satellite signals by performing a weighted calculation while weighting an azimuth of a corresponding satellite with the calculated weighting coefficient; and
   selecting satellite signals from the received satellite signals using the deflection value, and locating a position using the selected satellite signals.

2. The positioning method as defined in claim 1, wherein the changing of the weighting coefficient includes changing the relationship between the signal strength and the weighting coefficient so that the weighting coefficient for an identical signal strength increases when the present positioning mode is a mode that is appropriate for positioning in a weaker electric field environment.

3. The positioning method as defined in claim 1, the method further comprising
   selecting a satellite signal transmitted from a satellite positioned in an azimuth opposite to a deflection azimuth of the calculated deflection value as a satellite signal that is inappropriate for positioning calculations.

4. A positioning method comprising:
   variably setting an adjustment coefficient that adjusts a degree of deflection of each of received satellite signals;
   calculating a deflection value of the received satellite signals by performing a weighted calculation while weighting an azimuth of each satellite based on the adjustment coefficient that has been set in addition to weighting based on a signal strength of each of the received satellite signals; and
   selecting satellite signals from the received satellite signals using the deflection value, and locating a position using the selected satellite signals.

5. The positioning method as defined in claim 4, wherein the variably setting the adjustment coefficient includes changing the adjustment coefficient depending on the number of received satellite signals.

6. A positioning method comprising:
   calculating a deflection value of received satellite signals by performing a weighted calculation while weighting an azimuth of each satellite based on a signal strength of the satellite signal received from the corresponding satellite;
   calculating positioning appropriateness of each of the received satellite signals based on the deflection value and the azimuth of each satellite; and
   selecting satellite signals from the received satellite signals using the positioning appropriateness, and locating a position using the selected satellite signals.

7. The positioning method as defined in claim 6, the method further comprising
   calculating the positioning appropriateness of each of the satellite signal transmitted from each of the satellites based on a distance between a plotted point of the deflection value and a plotted point of each of the satellites when plotting the deflection value calculated by the index value calculation method inside a unit circle of which a direction from its center indicates an azimuth and plotting each of the satellites on a circumference of the unit circle at a position corresponding to the azimuth of each of the satellites.

8. A positioning circuit comprising:
   a correspondence coefficient change section that changes a weighting coefficient for a signal strength of a satellite signal depending on a present positioning mode among a plurality of positioning modes predetermined for a positioning calculation section;
   a coefficient calculation section that calculates the weighting coefficient for the signal strength of each of the received satellite signals based on a relationship between the signal strength of the satellite signal and the weighting coefficient that has been changed by the correspondence coefficient change section;
   a deflection value calculation section that calculates a deflection value of the received satellite signals by performing a weighted calculation while weighting an azimuth of a corresponding satellite with the weighting coefficient calculated by the coefficient calculation section; and
   a positioning section that selects satellite signals from the received satellite signals using the deflection value, and locates a position using the selected satellite signals.

9. The positioning circuit as defined in claim 8, wherein
the correspondence coefficient change section changes the relationship between the signal strength and the weighting coefficient so that the weighting coefficient for an identical signal strength increases when the present positioning mode is a mode that is appropriate for positioning in a weaker electric field environment.

10. An electronic instrument comprising the positioning circuit as defined in claim 8.

11. A positioning circuit comprising:
an adjustment coefficient setting section that variably sets an adjustment coefficient that adjusts a degree of deflection of each of the received satellite signals;
a deflection value calculation section that calculates a deflection value by performing a weighted calculation while weighting an azimuth of each satellite based on the adjustment coefficient set by the adjustment coefficient setting section in addition to weighting based on a signal strength of each of the received satellite signals; and
a positioning section that selects satellite signals from the received satellite signals using the deflection value, and locates a position using the selected satellite signals.

12. The positioning circuit as defined in claim 11, wherein
the adjustment coefficient setting section changes the adjustment coefficient depending on the number of received satellite signals.

13. An electronic instrument comprising the positioning circuit as defined in claim 11.

14. A positioning circuit comprising:
a deflection value calculation section that calculates a deflection value of received satellite signals by performing a weighted calculation while weighting an azimuth of each satellite based on a signal strength of the satellite signal received from the corresponding satellite;
a positioning appropriateness calculation section that calculates positioning appropriateness of each of the received satellite signals based on the deflection value and the azimuth of each satellite; and
a positioning section that selects satellite signals from the received satellite signals using the positioning appropriateness, and locating a position using the selected satellite signals.

15. An electronic instrument comprising the positioning circuit as defined in claim 14.

* * * * *